United States Patent
Zyskind et al.

(10) Patent No.: US 10,216,333 B2
(45) Date of Patent: Feb. 26, 2019

(54) PHASE ERROR COMPENSATION IN SINGLE CORRELATOR SYSTEMS

(71) Applicant: Microsoft Technology Licensing, LLC, Redmond, WA (US)

(72) Inventors: Amir Zyskind, Natania (IL); On Haran, Saba (IL); Jonathan Westhues, Portland, OR (US); Arie Yehuda Gur, Kiryat ono (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/639,420

(22) Filed: Jun. 30, 2017

(65) Prior Publication Data
US 2019/0004664 A1    Jan. 3, 2019

(51) Int. Cl.
*G06F 3/041*  (2006.01)
*G06F 3/0354*  (2013.01)
*G06F 3/044*  (2006.01)

(52) U.S. Cl.
CPC ........ *G06F 3/0418* (2013.01); *G06F 3/03545* (2013.01); *G06F 3/044* (2013.01); *G06F 3/0412* (2013.01)

(58) Field of Classification Search
USPC .......................................... 345/156, 170–176
See application file for complete search history.

(56) References Cited

U.S. PATENT DOCUMENTS

| | | | |
|---|---|---|---|
| 8,165,830 B2 | 4/2012 | McAnally et al. | |
| 8,232,977 B2 | 7/2012 | Zachut et al. | |
| 9,965,675 B2 * | 5/2018 | Schinas | G06K 9/00335 |
| 2006/0053371 A1 * | 3/2006 | Anderson | G06F 3/016 |
| | | | 715/701 |
| 2011/0037712 A1 * | 2/2011 | Kim | H04M 1/7253 |
| | | | 345/173 |
| 2013/0141364 A1 | 6/2013 | Lynn et al. | |
| 2013/0342571 A1 * | 12/2013 | Kinnebrew | G06F 3/147 |
| | | | 345/633 |

(Continued)

OTHER PUBLICATIONS

"International Search Report and Written Opinion Issued in PCT Application No. PCT/US2018/034503", dated Jul. 25, 2018, 12 Pages.

*Primary Examiner* — Tony O Davis
(74) *Attorney, Agent, or Firm* — Arent Fox LLP (57) ABSTRACT

Present disclosure provides techniques to compensate for the above-identified signal processing delays between an in-cell digitizer of the touch screen display system and a stylus (or pen). In one example, the delays may be compensated by estimating the stylus-digitizer phase error on the digitizer side and adjusting for the delay accordingly. Specifically, in this example, the digitizer may utilize a quadratic receiver to perform an in-phase and quadratic detection in time domain in order to estimate the phase error. Based on the in-phase and quadratic detection, the digitizer may adapt the subsequent stylus sampling windows to compensate for the detected phase error. In another example, the stylus may transmit a first signal and a second signal that is 90 degrees delayed during a predetermined time slot, and to adapt the stylus sampling windows on the digitizer side in order to compensate for the phase delay.

20 Claims, 4 Drawing Sheets

(56) References Cited

U.S. PATENT DOCUMENTS

| | | | |
|---|---|---|---|
| 2014/0028577 A1* | 1/2014 | Krah | G06F 3/0416 345/173 |
| 2014/0176495 A1 | 6/2014 | Vlasov | |
| 2014/0347311 A1 | 11/2014 | Joharapurkar et al. | |
| 2015/0002415 A1* | 1/2015 | Lee | G06F 3/03545 345/173 |
| 2015/0234456 A1* | 8/2015 | Cho | G06F 3/011 345/156 |
| 2015/0235453 A1* | 8/2015 | Schowengerdt | G06T 19/006 345/633 |
| 2015/0235583 A1* | 8/2015 | Schowengerdt | G09G 3/007 345/690 |
| 2015/0256329 A1 | 9/2015 | Cheong et al. | |
| 2015/0324029 A1 | 11/2015 | Bakken et al. | |
| 2015/0338968 A1 | 11/2015 | Yao et al. | |
| 2016/0117047 A1 | 4/2016 | Dinu et al. | |
| 2016/0139732 A1* | 5/2016 | Takeda | G06F 3/044 345/174 |
| 2016/0158640 A1* | 6/2016 | Gupta | A63F 13/213 463/3 |
| 2016/0170506 A1* | 6/2016 | Westhues | G06F 3/03545 345/174 |
| 2016/0195941 A1* | 7/2016 | Gur | G06F 3/03545 345/173 |
| 2016/0195944 A1* | 7/2016 | Gur | G06F 3/03545 345/174 |
| 2016/0209940 A1* | 7/2016 | Geller | G06F 3/0416 |
| 2016/0282965 A1* | 9/2016 | Jensen | G06F 3/03545 |
| 2016/0299583 A1 | 10/2016 | Watanabe | |
| 2016/0378208 A1 | 12/2016 | Shahparnia et al. | |
| 2017/0038884 A1* | 2/2017 | Qiao | G06F 3/0416 |
| 2017/0083164 A1 | 3/2017 | Sheng et al. | |
| 2017/0097695 A1* | 4/2017 | Ribeiro | G06F 3/0383 |
| 2017/0108984 A1* | 4/2017 | Takaya | G06F 3/0416 |
| 2017/0109516 A1* | 4/2017 | Engelhardt | G06F 21/36 |
| 2017/0123568 A1* | 5/2017 | Takeda | G06F 3/0416 |
| 2017/0192549 A1* | 7/2017 | Katayama | G06F 3/041 |
| 2017/0192591 A1* | 7/2017 | Jang | G06F 3/0416 |
| 2017/0255282 A1* | 9/2017 | Winebrand | G06F 3/03545 |
| 2017/0255328 A1* | 9/2017 | Zyskind | G06F 3/03545 |
| 2017/0277940 A1* | 9/2017 | Vandonkelaar | A63F 13/212 |
| 2017/0285771 A1* | 10/2017 | Jung | G06F 3/0383 |
| 2017/0322623 A1* | 11/2017 | McKenzie | G06F 3/013 |
| 2017/0322646 A1* | 11/2017 | Gur | G06F 3/0383 |
| 2017/0330387 A1* | 11/2017 | Dearman | G06T 19/20 |
| 2017/0336882 A1* | 11/2017 | Tome | G06F 3/0346 |
| 2017/0356282 A1* | 12/2017 | Close | G01P 15/132 |
| 2017/0364167 A1* | 12/2017 | Ribeiro | G06F 3/03545 |
| 2018/0033204 A1* | 2/2018 | Dimitrov | G06T 19/006 |
| 2018/0061133 A1* | 3/2018 | Wu | H04W 4/70 |
| 2018/0074619 A1* | 3/2018 | Chandran | G06F 3/03545 |
| 2018/0081439 A1* | 3/2018 | Daniels | G06F 3/016 |
| 2018/0088691 A1* | 3/2018 | Westhues | G06F 3/0416 |
| 2018/0095553 A1* | 4/2018 | Birenberg | G06F 3/03545 |

* cited by examiner

PHASE ERROR COMPENSATION IN SINGLE CORRELATOR SYSTEMS

BACKGROUND

Touch screen displays are commonplace in today's commercial electronic devices. Such displays are finding widespread use in many new products, such as cellular phones, personal digital assistants (PDAs), camcorders, and laptop personal computers (PCs). Touch screen displays can be configured with either a finger touch input and/or a stylus (or "pen") touch input. Over the years, a number of touch detection technologies have been developed that allow the touch screen display to accurately identify the location of the touch on the display screen.

Traditionally, one such technology utilizes capacitive touch panels that identify the point of the touch using sensors that detect changes in electrical current generated by contact with a finger and/or stylus that change the electrostatic capacity (e.g., load). There are two types of capacitive touch panels: surface capacitive touch panels and projected capacitive touch panels. In surface capacitive touch panels, electric voltage is applied to electrodes positioned in the four corners of the glass substrate, generating a uniform low-voltage electrical field across the entire touch screen display screen. The coordinates of the position at which the finger touches the screen are identified by measuring the resulting changes in electrostatic capacity at the four corners of the panel. In projected capacitive touch panel, a layer of transparent electrodes is positioned with the electrodes in a specific pattern and the surface is covered with an insulating glass or plastic cover. When a finger approaches the surface, the electrostatic capacity among multiple electrodes changes simultaneously, and the position where contact occurs can be identified by measuring the ratios between the electrical currents.

Unlike a finger touch that allows the capacitive touch panels to leverage the conductive properties of human body to detect a change in the screen's electrical field, however, the touch screen displays are unable to leverage the touch of a stylus to accurately identify the stylus touch. To address this problem, the touch screen displays may also separately use a "digitizer" to enable communication between the touch screen display and the stylus and the user touch. The digitizer is a component used to convert analog signals into digital signals. In the context of the touch screen displays, the digitizer may measure self-capacitance to detect and convert user actions (e.g., touch, swipe) into a digital signal that could processed by the electronic device associated with the touch screen display (e.g., tablet, laptop, mobile phone).

Many touch screen displays produced today that utilize capacitive touch panels, however, rely on the touch layer to be sandwiched between a display panel (e.g., the panel producing the images for display) and a cover layer (e.g., glass or plastic layer), adding to the overall width of the screen. With the drive to reduce the size of the consumer electronic devices, display manufacturers have developed "in-cell" touch system that generally refers to the implementation of touch sensors that are physically inside the cell of a display panel. While this removes the need for the touch layer to be a separate layer from the display panel, such integration raise other challenges, including challenges with respect to accurately detecting stylus touch.

SUMMARY

Aspects of the present disclosure provide techniques to compensate for the above-identified problem between a digitizer of the touch screen display system and a stylus (or pen). Specifically, for a receiver on the digitizer side that may not include a quadratic detector (e.g., in-cell touch screen display systems), in order to maintain time synchronization between the touch screen and the stylus, the system may be sensitive to the relative phase between the stylus signal and the correlation signal at the digitizer.

To that end, in one example, the delays may be compensated by estimating the stylus-digitizer phase error on the digitizer side and adjusting for the delay accordingly. Specifically, in this example, the digitizer may utilize a quadratic receiver to perform an in-phase and quadratic detection in time domain in order to estimate the phase error. Based on the in-phase and quadratic detection, the digitizer may adapt the subsequent stylus sampling windows to compensate for the detected phase error. In another example, the stylus may transmit a first signal and a second signal that is 90 degrees delayed during a predetermined time slot. The quadratic receiver at the digitizer may correlate the received signals to identify the delay and to adapt the stylus sampling windows on the digitizer side in order to compensate for the phase delay. The digitizer may also identify the phase delay based on the quadratic receiver and transmit a command, through an uplink signal, to the stylus instructing the stylus to shift the phase at the stylus.

In one example, a method for time synchronizing an in-cell touch screen display with a stylus is disclosed. The method may include receiving, at a digitizer of the in-cell touch screen display, a downlink signal from the stylus associated with the touch screen display. The method may further include determining, at the digitizer, a timing misalignment between the in-cell touch screen display and the stylus by measuring self-capacitance of a sensel electrode on the in-cell touch screen display based on the downlink signal. In some examples, the method may further include adjusting, at the digitizer, a sampling window to compensate for the timing misalignment.

In another example, an apparatus for time synchronizing an in-cell touch screen display with a stylus is disclosed. The apparatus may include a processor and a memory coupled to the processor. The memory may include instructions executable by the processor to receiving, at a digitizer of the in-cell touch screen display, a downlink signal from the stylus associated with the touch screen display. The memory may include instructions executable by the processor to determine, at the digitizer, a timing misalignment between the in-cell touch screen display and the stylus by measuring self-capacitance of a sensel electrode on the in-cell touch screen display based on the downlink signal. In some examples, the instructions may further be executable by the processor to adjust, at the digitizer, a sampling window to compensate for the timing misalignment.

In another example, a computer readable medium for time synchronizing an in-cell touch screen display with a stylus is disclosed. The computer readable medium may include code for receiving, at a digitizer of the in-cell touch screen display, a downlink signal from the stylus associated with the touch screen display. The computer readable medium may further include code for determining, at the digitizer, a timing misalignment between the in-cell touch screen display and the stylus by measuring self-capacitance of a sensel electrode on the in-cell touch screen display based on the downlink signal. In some examples, the computer readable medium may further include code for adjusting, at the digitizer, a sampling window to compensate for the timing misalignment.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

As discussed above, display manufacturers have recently moved towards development of "in-cell" touch systems that integrate a touch sensor and digitizer physically inside the cell of a display panel (e.g., liquid-crystal display (LCD), organic LED). In contrast, an "out-cell" digitizer may utilize a sensor matrix consisting of electrically-conducting rows and columns placed in front of the display panel (or layer). While the in-cell integration allows the manufacturers to develop thinner touch screen display systems, however, the integration also raises additional challenges, especially with respect to the use of a stylus (or pen) on a touch screen displays.

Specifically, in-cell touch systems may be limited to a single correlator. For example, in contrast to out-cell touch systems that allow each electrode (e.g., each row and column of electrodes across the touch screen display) to contain a plurality of correlators that may each compute a cross-correlation between an incoming current against multiple (and different) reference waveforms simultaneously, the in-cell touch systems are limited to a single correlator due to silicon area constraints. This is because introducing multiple correlators per channel into an in-cell touch system may require additional hardware that may not be feasible in limited areas. The limited single correlator requires the stylus to maintain only a small margin of phase error in order for the stylus and the touch screen display to remain synchronized.

However, there may be delays in signal processing at one or both of the digitizer and the stylus sides. While delays that are constant (and thus predictable) may be correctable, the digitizer and the stylus may also include variable delays that may be a function of integrated circuit process, voltage, and/or temperature. Failure to correct such delays may result in the stylus and the digitizer falling out of phase from one another and thus be desynchronized.

The present disclosure provides techniques to compensate for the above-identified signal processing delays between a digitizer of the touch screen display system and a stylus (or pen). The digitizer may be an in-cell digitizer or an out-cell digitizer associated with a touch screen display. In one example, the delays may be compensated by estimating the stylus-digitizer phase error on the digitizer side and adjusting for the delay accordingly. Specifically, in this example, the digitizer may utilize a pseudo-quadratic receiver to perform an in-phase and quadratic detection in the time domain in order to estimate the phase error. Based on the in-phase and quadratic detection, the digitizer may adapt its subsequent stylus sampling windows to compensate for the detected phase error. In another example, the stylus may transmit a first signal and a second signal that is 90 degrees delayed relative to the first signal during a predetermined time slot. The quadratic receiver at the digitizer may correlate the received signals to identify the delay and to adapt its stylus sampling windows in order to compensate for the phase delay. Thus, the present disclosure may enable identifying and compensating for phase delay between the digitizer and the stylus using the existing capacitance circuitry, and therefore without adding any additional cost.

Various features are now described in more detail with reference to the FIGS. 1-4. In the following description, for purposes of explanation, numerous specific details are set forth in order to provide a thorough understanding of one or more aspects. It may be evident, however, that such feature (s) may be practiced without these specific details. Additionally, the term "component" as used herein may be one of the parts that make up a system, may be hardware, firmware, and/or software stored on a computer-readable medium, and may be divided into other components.

Further, for the purposes of the present disclosure, the term "finger touch" used throughout this document may generally refer to any physical user contact (e.g., finger, palm, hand) on the touch screen display or a touch sensitive surface of an electronic device using capacitive sensors or the like. It should also be appreciated that virtual touch inputs relative to projected displays, electronic whiteboards, or other surfaces are treated in the same manner as actual touch inputs on a touch-sensitive surface of the touch screen display. Such virtual touch inputs may be detected using techniques such as, but not limited to, using cameras or other imaging technologies to track user finger movement relative to a projected image, physical object, or text.

Additionally, as noted above, terms "stylus" and "pen" may be used interchangeably herein. The terms "stylus input" or "pen input" may refer to interaction involving physical contact or near contact (or hover) of the sensor stylus or pen with a touch sensitive surface or digitizer component of the touch screen display or the electronic device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples Turning first to FIG. 1, a schematic diagram 100 includes an example of an electronic device 105 (e.g., tablet, laptop, mobile phone) that may implement features of the present disclosure described herein with respect to processing signal delays between an digitizer 130 of a touch screen display 110 and a stylus 115. Although the digitizer 130 may be described with reference to "in-cell digitizer," it should be appreciated by those of ordinary skill in the art that features of the present disclosure may also be implemented on "out-cell" touch screen displays and digitizers.

Figure 1:
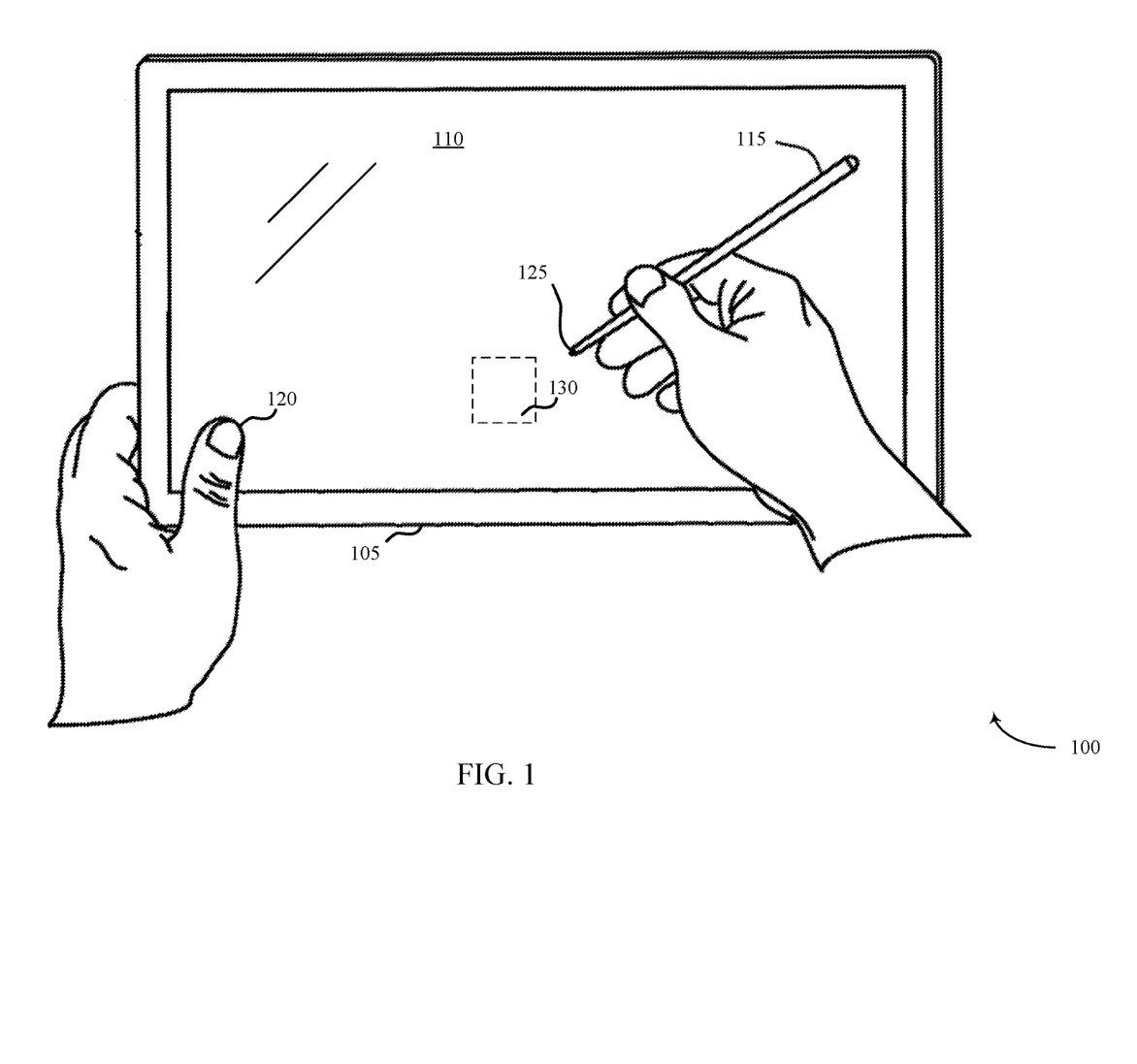
FIG. 1 is a schematic diagram of an example of an in-cell touch screen display system that processes signal delays between an in-cell digitizer of the touch screen display system and a stylus in which features of the present disclosure may operate.

The stylus 115 may be an "active stylus" (or "active pen") that includes electronic components (e.g., battery, processor) and allows users to write directly onto the surface of the touch screen display 110. In contrast to a conventional "passive stylus" that is simply a grounded passive object, the active stylus 115 may provide enhanced functionality to the user, including, but not limited to, controlling touch sensitivity, input buttons, etc. The active stylus 115 may also contain electrodes in the tip 125 of the active stylus 115. In some examples, upon initialization of the active stylus 115 with the touch screen display 110, each of the two paired devices may be synchronized with respect to timing such that when a first device (e.g., stylus 115) transmits a signal, the second device (e.g., touch screen display 110) may be activing listening for the transmitted signal during one or more predetermined time slots. In some cases, the in-cell digitizer 130 incorporated into the touch screen display 110 may act as a timing master and the stylus 115 may synchronize to it by using beacon signals. Once synchronization is established, communication between the touch screen display 110 and the stylus 115 may be ensue.

In addition to detecting stylus touch, the in-cell touch screen display 110 may also be configured to detect and process user input from a finger touch 120. As noted above, current technological advances have allowed display manufacturers to forego a dedicated touch layer by etching the electrodes of the touch sensors, including the digitizers, directly into the layer of the display panel (e.g., LCD) of the touch screen display 110. Such integration allows for thinner and less bulkier display screens. Consequently, as illustrated in FIG. 1, the touch screen display 110 may incorporate both the touch sensors (e.g., capacitive touch sensors) and the digitizer 130 as part of the same layer. For purposes of the present disclosure, the terms "digitizer" and "in-cell digitizer" may be used interchangeably to refer to the digitizer that is etched into the display panel of the touch screen display 110. The digitizer 130 may also be capable of measuring self-capacitance on the touch screen display 110. Measurement of self-capacitance may provide detectability of a finger or stylus touch.

Specifically, with respect to the finger touch, the touch screen display 110 may apply a voltage on the plurality of sensel electrodes across the display screen in order to measure the current at each sensel electrode. As the grounded finger, for example, moves close to the sensel, the capacitance will increase, which thereby will cause an increase in the measured current. As such, the digitizer 130 may report the position of the finger touch to the electronic device 105. However, with respect to the stylus touch (or hover) features of the present disclosure, the digitizer 130 may measure capacitance to the electrode tip 125 of the stylus 115 by applying a voltage on the electrode tip 125 and measuring the current into the plurality of sensel electrodes, as opposed to measuring capacitances to ground as in the case for finger touch.

In the above framework, while the in-cell integration allows the manufacturers to develop a thinner touch screen display 110, the integration also limits the display systems to only a single correlator due to silicon area constraints. Thus, as opposed to previous systems, where a plurality of correlators may be relied upon to compute the cross-correlation between the incoming current and multiple reference waveforms, utilization of an in-cell digitizer for detection of stylus touch may limit the display screen to only a single correlator.

This may raise additional problems to the extent that the stylus 115 may be required to maintain an extremely small phase error in order to maintain time synchronization between the touch screen display 110 and the stylus 115. Specifically, as discussed above, the touch screen display 110 and stylus 115 initialize such that the paired devices are time synchronized. Absent time synchronization, the touch screen display 110 and stylus 115 would be unable to communicate effectively, and thus adversely impact user interaction with the touch screen display 110 and stylus 115 (e.g., delayed stylus touch detection, false detections).

With silicon area constraints that are introduced by the in-cell nature of the design, relying on a single digitizer correlator raises challenges in maintaining such time synchronization because the touch screen display 110 and stylus 115 are permitted only a very small margin of error. Specifically, with only a single correlator per electrode, and in the absence of multiple correlators to conduct cross-correlation, the in-cell digitizer would be required to synchronize the touch screen display 110 and the stylus 115 to within an amount of time that is smaller compared to the period of the measurement signal. For example, if the touch screen display 110 is exciting at 100 kilohertz for 100 microseconds, the touch screen display 110 and stylus 115 would need to maintain less than 2.5 microseconds of timing uncertainty (or "timing misalignment"), which may correspond to a ninety degree phase shift (e.g., if the in-cell digitizer is correlating for sine waveform, then it may actually be receiving a cosine waveform—resulting in a 2.5 microseconds of timing inaccuracy). In this case, a timing offset between the touch screen display 110 and stylus 115 of greater than 2.5 microseconds, however, would result in a complete loss of signal because a correlation reference signal and the received current from the stylus would be out of phase. The correlation reference signal may be generated by the digitizer based in part on the internal clock source of the digitizer.

This is because while the hardware architecture of the in-cell digitizers (e.g., field-programmable gate array (FPGA), digital application-specific integrated circuit (ASIC), etc.) may generate a signal (or waveform) for transmission during a specified time slot at a high level of accuracy, the same is not true once the waveform is sent through the level shifter and a power driver that generate the actual signal that is ultimately applied to the electrodes with a higher voltage and higher current drive. Thus, components such as level shifter and power driver may introduce a variable delay to the signal that may be based on factors such as temperature, circuit processes, etc. Similarly, the level shifter and the power driver in the stylus 115 may also add delay in signals generated from the stylus 115 that require timing adjustment by either the stylus 115 or the in-cell digitizer aiding the stylus 115 in correcting the phase error.

Thus, the present disclosure time synchronizes the stylus 115 to the in-cell digitizer 130 within the timing requirements of a single correlator by estimating the stylus-digitizer phase error on the digitizer side and adjusting for the delay accordingly. Specifically, in this example, the in-cell digitizer 130 may utilize a quadratic receiver to perform an in-phase and quadratic detection in the time domain in order to estimate the phase error. Based on the in-phase and quadratic detection, the digitizer 130 may adapt its subsequent stylus sampling windows to compensate for the detected phase error. In another example, the stylus 115 may transmit a first signal and a second signal that is 90 degrees delayed relative to the first signal during a predetermined time slot. The pseudo quadratic receiver at the digitizer may correlate the received signals to identify the delay and to adapt its stylus sampling windows in order to compensate for the phase delay. Thus, in this example, the digitizer may remain in phase while the stylus 115 may adjust its phase based on commands and signals received on the uplink from the digitizer 130.

Figure 2:
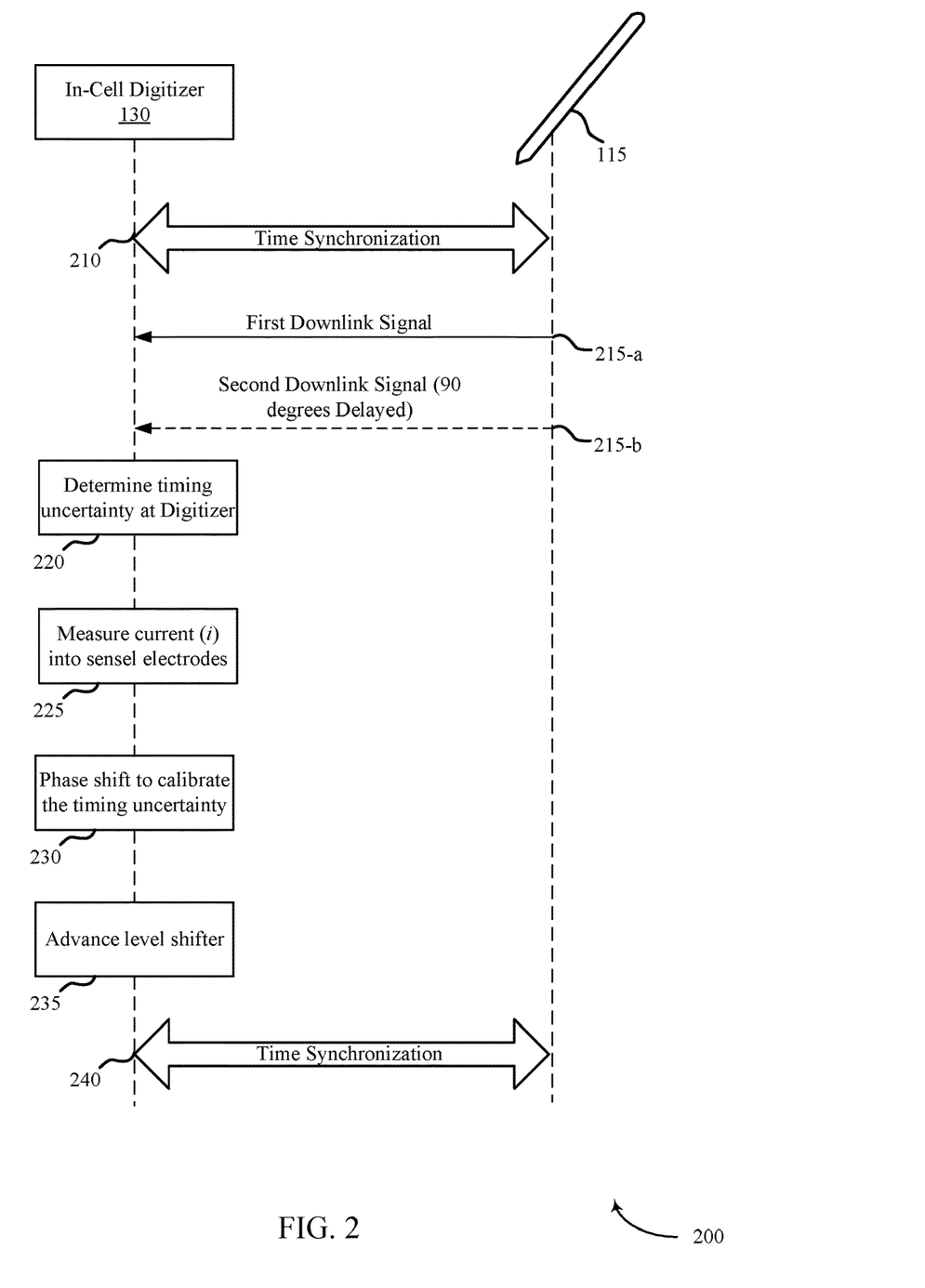
FIG. 2. is a call flow between in-cell digitizer and a stylus implementing one technique of calibrating for timing uncertainty in the transmissions in accordance with various aspects of the present disclosure.

Referring next to FIG. 2, a call flow diagram 200 illustrates techniques of time synchronizing the in-cell digitizer 130 and the stylus 115. The in-cell digitizer 130 may be an example of the digitizer 130 described as part of the touch screen display 110 in reference to FIG. 1. The stylus 115 may also be an example of the stylus 115 described with reference to FIG. 1.

At 210, the in-cell digitizer 130, acting as a master, may initialize time synchronization between the in-cell digitizer 130 and the stylus 115 whereby the stylus 115 may synchronize with the in-cell digitizer 130 (and by extension the touch screen display 110) using beacon signals to pair the two devices. Once the stylus 115 obtains time synchronization from the in-cell digitizer 130, the stylus 115, at 215-a, may transmit a first downlink signal to the in-cell digitizer 130 by applying a voltage on its electrodes at the tip 125 of the stylus 115 (see FIG. 1). For the purposes of the disclosure the term "uplink communication" may refer to transmissions from the in-cell digitizer 130 to the stylus, while the term "downlink communication" may refer to communication from the stylus 115 to the in-cell digitizer 130.

Additionally or alternatively, the stylus 115, at 215-b, may also transmit a second downlink signal that is a 90 degree delayed signal with reference to the first signal during a predetermined time slot. Thus, if the first downlink signal at 215-a is a cosine waveform, the second downlink signal at 215-b may be a sine waveform. As will be discussed below, in some examples, the receiver (e.g., in-cell digitizer 130) may correlate with the in-phase received signal (e.g., either first downlink signal 215-a or the second downlink signal 215-b) from the stylus 115 by adapting the stylus sampling windows at the in-cell digitizer 130 to compensate for the phase delay.

At 220, the in-cell digitizer 130 may continuously and dynamically calibrate for timing uncertainties that may have resulted from the hardware architecture of the touch screen display 110, such as the delays introduced by the level shifter and the power driver as discussed above. To that end, the in-cell digitizer 130, at 225, may determine the timing uncertainty by transmitting a signal on the sensel electrode (located on the touch screen display 110) and measuring the electric current (i) flow of electric charge into the sensel electrodes. Specifically, the delay in the voltage transmission may cause the delay in the current (i). Thus, features of the present disclosure may leverage the self-capacitance circuit to remove the timing uncertainty in the transmission by the digitizer 130.

For example, at 230, the in-cell digitizer 130 may adjust the phase of a correlation reference signal until it finds the phase at which the correlation is maximized. That is, the phase shift corresponds to the point where the correlation reference signal and the actual transmitted waveform (e.g., output of the level shifter) are aligned.

Based on the identification of the phase error in relation to the correlation reference signal, the in-cell digitizer 130, at 235, may advance the signal (waveform) for transmission at the input to the level shifter by the total time required to make the transmission of the in-cell digitizer waveform be synchronized with the stylus 115, irrespective of the delay introduced by the level shifter. For the purposes of this disclosure, the phrase "advance the signal," as used herein, may refer to transmitting a signal at a period of time prior to its originally intended time slot. For example, if the signal would otherwise would have been transmitted at time period $T_5$, "advancing the signal" may refer to transmitting the same signal at $T_3$ (where $T_3$ is sooner in time than $T_5$) in order to compensate for the delays that would be introduced between transmission of the signal from the in-cell digitizer 130 and the output of the level shifter.

At 240, based on in-cell digitizer 130 dynamically calibrating against timing uncertainties caused in signal processing, the touch screen display 110 and stylus 115 maintain time synchronization.

Figure 3:
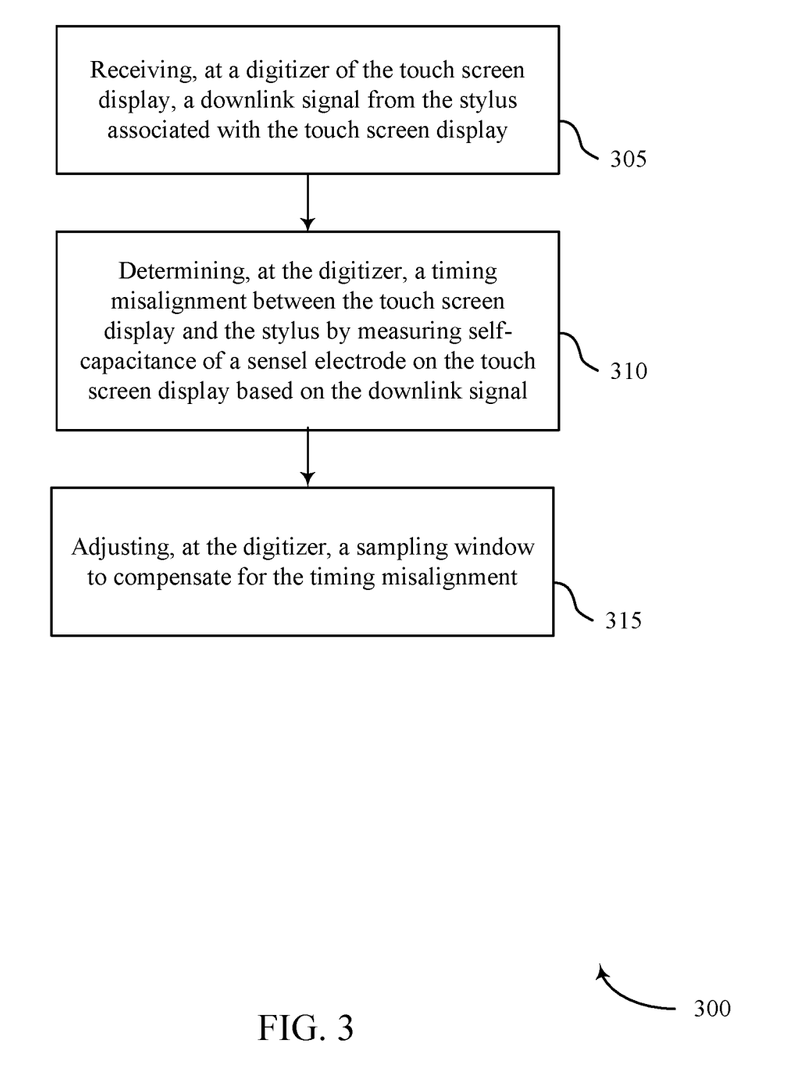
FIG. 3 is a flowchart of a method for time synchronizing an in-cell touch screen display with a stylus implemented by an in-cell digitizer in accordance with aspects of the present disclosure.
Figure 4:
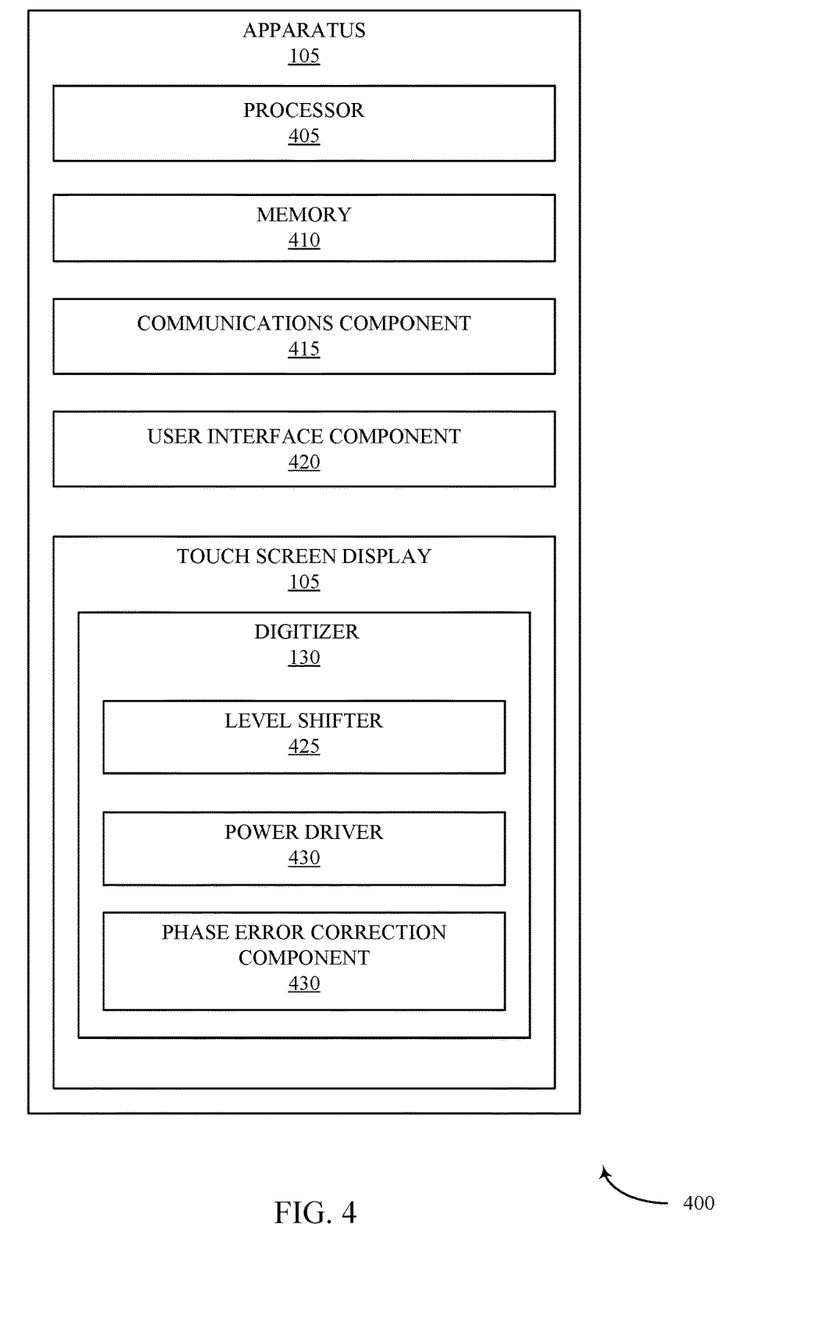
FIG. 4 is a diagram illustrating an example of a hardware implementation for a touch screen display in accordance with various aspects of the present disclosure.

FIG. 3 is described in combination with FIG. 4 that illustrates the hardware components to perform an example method 300 for time synchronizing an touch screen display with a stylus is described. The method 300 may be performed by the digitizer 130 of the touch screen display 110 as described with reference to FIGS. 1-2. Although the method 300 is described below with respect to the elements of the digitizer 130 of the touch screen display 110, other components may be used to implement one or more of the actions described herein.

At block 305, the method 300 may include receiving, at a digitizer of the touch screen display, a downlink signal from the stylus associated with the touch screen display. In some examples, the downlink signal is received from the stylus by measuring an electric current (i) flow of electric charge into the plurality of sensel electrodes of the digitizer 130 when the stylus 115 applies voltage to electrodes located on tip of the stylus 115. In some examples, receiving the downlink signal may include receiving a first downlink signal from the stylus 115 during a first time slot, and receiving a second downlink signal from the stylus 115 during a second time slot. The second downlink signal may be 90 degrees delayed from the first downlink signal. For example, if the first downlink signal is a sine waveform, the second downlink signal would be a cosine waveform of the same signal. In some implementations, one or more of the actions of block 305 may be performed by communications component 415 described with reference to FIG. 4.

At block 310, the method 300 may include determining, at the digitizer, a timing misalignment between the touch screen display and the stylus by measuring self-capacitance of a sensel electrode on the in-cell touch screen display based on the downlink signal. In some examples, the timing misalignment is calculated by generating, at the digitizer 130, an uplink signal for transmission during a first time period and transmitting the uplink signal from the digitizer 130 to the plurality of sensel electrodes (e.g., a subset of all sensel electrodes) of the touch screen display 110. The method 300 at block 310 may further measure an electric current (i) flow of electric charge into the plurality of sensel electrodes during a second time period. Based on the measurement, the digitizer 130 may calculate a delay in time (e.g., a timing misalignment) from the first time period to the second time period. In some implementations, one or more of the actions of block 310 may be performed by in-cell digitizer 130 described with reference to FIGS. 1, 2, and 4.

At block 315, the method 300 may include adjusting, at the digitizer, a sampling window to compensate for the timing misalignment. In some examples, adjusting the sampling window may include the digitizer 130 advancing the uplink signal waveform at the input of the level shifter by the amount of time identified in the timing misalignment. In some implementations, one or more of the actions of block 315 may be performed by phase error correction component 430 described with reference to FIG. 4.

Referring now to FIG. 4, a diagram illustrating an example of a hardware implementation for a calibrating timing misalignment between the touch screen display and a stylus in accordance with various aspects of the present disclosure is described. In some examples, the apparatus 105 may be an example of the electronic device described with reference to FIG. 1 that includes a display (see FIG. 1, touch screen display 110). The apparatus 105 may include a processor 405 for carrying out one or more processing functions (e.g., method 300) described herein. The processor 405 may include a single or multiple set of processors or multi-core processors. Moreover, the processor 405 can be implemented as an integrated processing system and/or a distributed processing system.

The apparatus 105 may further include memory 410, such as for storing local versions of applications being executed by the processor 405. In some aspects, the memory 410 may be implemented as a single memory or partitioned memory. In some examples, the operations of the memory 410 may be managed by the processor 405. Memory 410 can include a type of memory usable by a computer, such as random access memory (RAM), read only memory (ROM), tapes, magnetic discs, optical discs, volatile memory, non-volatile memory, and any combination thereof. Additionally, the processor 405, and memory 410 may include and execute operating system (not shown).

Further, apparatus 105 may include a communications component 415 that provides for establishing and maintaining communications with one or more parties utilizing hardware, software, and services as described herein. Communications component 415 may carry communications between components on display device 105, as well as between the digitizer 130 and the stylus 115. The communications component 415 may also facilitate communications with external devices to the apparatus 105, such as to electronic devices coupled locally to the apparatus 105 and/or located across a communications network and/or devices serially or locally connected to apparatus 105. For example, communications component 415 may include one or more buses operable for interfacing with external devices.

The apparatus 105 may also include a user interface component 420 operable to receive inputs from a user of display device 105 and further operable to generate outputs for presentation to the user. User interface component 420 may include one or more input devices, including but not limited to a navigation key, a function key, a microphone, a voice recognition component, any other mechanism capable of receiving an input from a user, or any combination thereof. Further, user interface component 420 may include one or more output devices, including but not limited to a display, a speaker, any other mechanism capable of presenting an output to a user, or any combination thereof.

The apparatus 105 may further include a touch screen display 110 that may be an example of the display described with reference to FIG. 1. In some examples, the touch screen display 110 may be an in-cell display that incorporates the touch sensors (e.g., capacitive touch sensors) and a digitizer to a single display panel layer. Thus, the touch screen display 110 may include an in-cell digitizer 130 to detect and communicate with a stylus 115. As discussed above, the digitizer may include components such as level shifter 425 and a power driver 430 that may add to the timing delay to the signal generated by the in-cell digitizer 130 based on factors such as based on factors such as temperature, circuit processes, etc.

The in-cell digitizer 130 may also include a phase error correction component 430 to compensate for the signal processing delays between an in-cell digitizer of the touch screen display system and a stylus (or pen) caused by components such as level shifter 425 and the power driver 430 in one or both of in-cell digitizer 130 and stylus 115. In one example, the delays may be compensated by estimating the stylus-digitizer phase error on the digitizer side and adjusting for the delay accordingly. Specifically, in this example, the digitizer may utilize a quadratic receiver to perform an in-phase and quadratic detection in time domain in order to estimate the phase error. Based on the in-phase and quadratic detection, the digitizer may adapt the subsequent stylus sampling windows to compensate for the detected phase error. In another example, the stylus may transmit a first signal and a second signal that is 90 degrees delayed during a predetermined time slot. The quadratic receiver at the digitizer may correlate the received signals to identify the delay and to adapt the stylus sampling windows on the digitizer side in order to compensate for the phase delay.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device, which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. In contract, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method for time synchronizing a touch screen display with a stylus, comprising:

receiving, at a digitizer of the touch screen display, a downlink signal from the stylus associated with the touch screen display;

determining, at the digitizer, a timing misalignment between the touch screen display and the stylus by measuring self-capacitance of a sensel electrode on the touch screen display based on the downlink signal; and adjusting, at the digitizer, a sampling window to compensate for the timing misalignment, based at least on a phase error between the digitizer and the stylus.

2. The method of claim 1, wherein determining the timing misalignment between the touch screen display and the stylus comprises:

generating, at the digitizer, an uplink signal for transmission during a first time period; and transmitting the uplink signal from the digitizer to the sensel electrode of the touch screen display.

3. The method of claim 2, further comprising:

measuring an electric current (i) flow of electric charge into the sensel electrode during a second time period;

calculating a delay in time from the first time period to the second time period; and adjusting a subsequent sampling window for transmissions of the uplink signal based on the delay.

4. The method of claim 3, wherein calculating the delay in time from the first time period to the second time period comprises:

correlating a waveform of the uplink signal against a reference waveform to identify a phase at which correlation is maximized.

5. The method of claim 1, wherein receiving the downlink signal from the stylus associated with the touch screen display, comprises:

receiving a first downlink signal from the stylus during a first time slot; and receiving a second downlink signal from the stylus during a second time slot, wherein the second downlink signal is 90 degrees delayed from the first downlink signal.

6. The method of claim 5, further comprising:

correlating an uplink signal for transmission against a quadrature signal of one of the first downlink signal or the second downlink signal; and adjusting a subsequent sampling window for transmissions of the uplink signal at the digitizer based on the correlation.

7. The method of claim 1, wherein the downlink signal is received from the stylus by measuring an electric current (i) flow of electric charge into the sensel electrode when the stylus applies voltage to electrodes located on a tip of the stylus.

8. The method of claim 1, wherein the touch screen display is an in-cell touch screen.

9. A touch screen display, comprising:

a digitizer;

a memory coupled to the digitizer, wherein the memory includes instructions executable by the digitizer to:

receive, at the digitizer of the touch screen display, a downlink signal from a stylus associated with the touch screen display;

determine, at the digitizer, a timing misalignment between the touch screen display and the stylus by measuring self-capacitance of a sensel electrode on the touch screen display based on the downlink signal; and adjust, at the digitizer, a sampling window to compensate for the timing misalignment, based at least on a phase error between the digitizer and the stylus.

10. The touch screen display of claim 9, wherein the instructions to determine the timing misalignment between the touch screen display and the stylus further includes instructions executable by the digitizer to:

generate, at the digitizer, an uplink signal for transmission during a first time period; and transmit the uplink signal from the digitizer to the sensel electrode of the touch screen display.

11. The touch screen display of claim 10, wherein the instructions are further executable by the digitizer to:

measure an electric current (i) flow of electric charge into the sensel electrode during a second time period;

calculate a delay in time from the first time period to the second time period; and adjust a subsequent sampling window for transmissions of the uplink signal based on the delay.

12. The touch screen display of claim 11, wherein the instructions to calculate the delay in time from the first time period to the second time period are further-executable by the digitizer to:

correlate a waveform of the uplink signal against a reference waveform to identify a phase at which correlation is maximized.

13. The touch screen display of claim 9, wherein the instructions to receive the downlink signal from the stylus associated with the touch screen display are further executable by the digitizer to:

receive a first downlink signal from the stylus during a first time slot; and receive a second downlink signal from the stylus during a second time slot, wherein the second downlink, signal is 90 degrees delayed from the first downlink signal.

14. The touch screen display of claim 13, wherein the instructions are further executable by the digitizer to:

correlate an uplink signal for transmission against a quadrature signal of one of the first downlink signal or the second downlink signal; and adjust a subsequent sampling window for transmissions of the uplink signal at the digitizer based on the correlation.

15. The touch screen display of claim 9, wherein the downlink signal is received from the stylus by measuring an electric current (i) flow of electric charge into the sensel electrode when the stylus applies voltage to electrodes located on a tip of the stylus.

16. The touch screen display of claim 9, wherein the touch screen display is an in-cell touch screen.

17. A computer-readable medium for time synchronizing a touch screen display with a stylus comprising code for:

receiving, at a digitizer of the touch screen display, a downlink signal from the stylus associated with the touch screen display;

determining, at the digitizer, a timing misalignment between the touch screen display and the stylus by measuring self-capacitance of a sensel electrode on the touch screen display based on the downlink signal; and adjusting, at the digitizer, a sampling window to compensate for the timing misalignment, based at least on a phase error between the digitizer and the stylus.

18. The computer-readable medium of claim 17, wherein the code for determining the timing misalignment between the touch screen display and the stylus further includes code for:

generating, at the digitizer, an uplink signal for transmission during a first time period; and transmitting the uplink signal from the digitizer to the sensel electrode of the touch screen display.

19. The computer-readable medium of claim 18, further comprising code for:
- measuring an electric current (i) flow of electric charge into the sensel electrode during a second time period;
- calculating a delay in time from the first time period to the second time period; and
- adjusting a subsequent sampling window for transmissions of the uplink signal based on the delay.

20. The computer-readable medium of claim 19, wherein the code for calculating the delay in time from the first time period to the second time period comprises code for:
- correlating a waveform of the uplink signal against a reference waveform to identify a phase at which correlation is maximized.

* * * * *